Dec. 14, 1937.  G. SKARPHOL  2,102,100
PORTABLE WEED BURNING ERADICATOR
Filed March 27, 1937   2 Sheets-Sheet 1
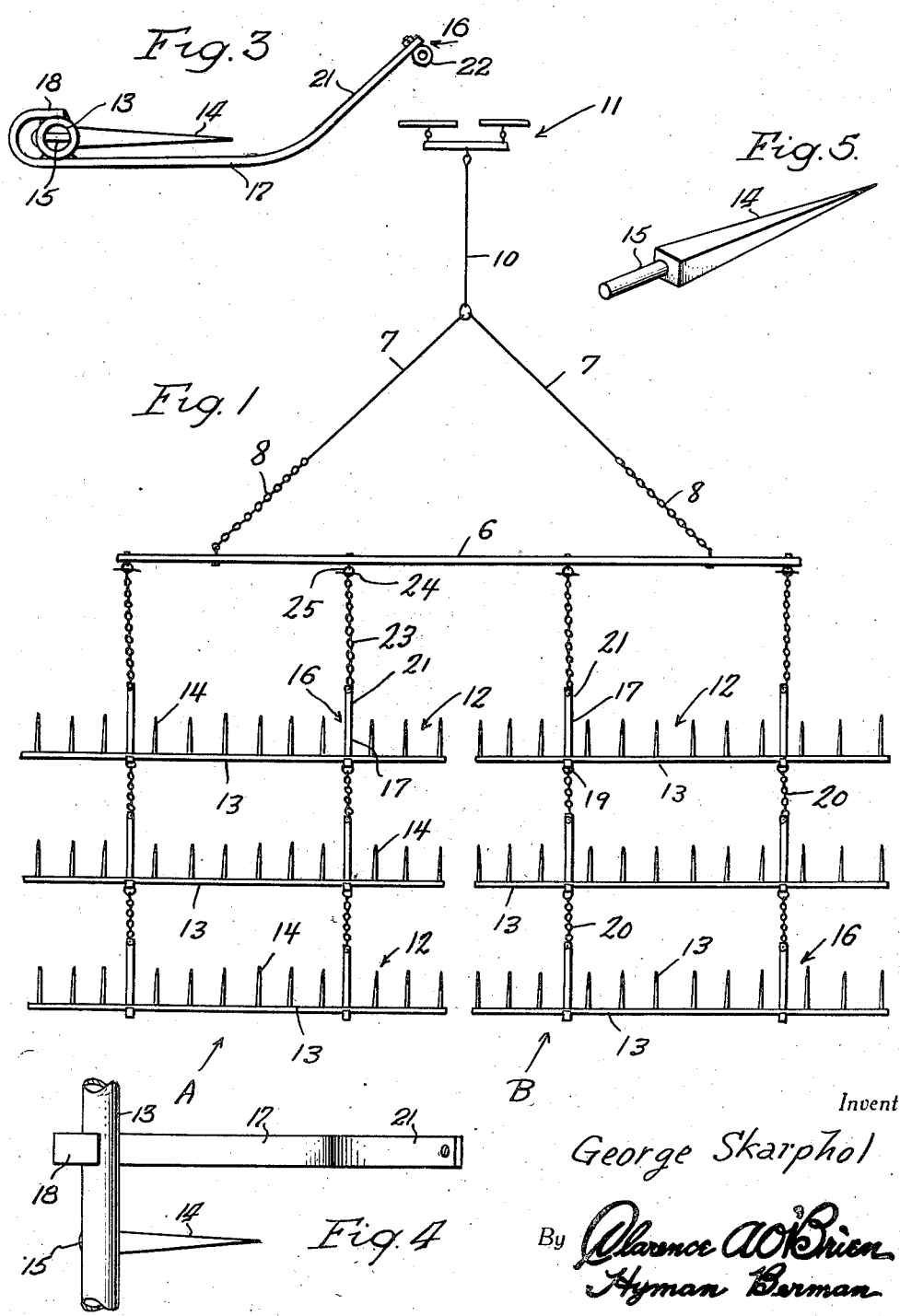
Inventor
George Skarphol
By Clarence A O'Brien
Hyman Berman
Attorneys Dec. 14, 1937.  G. SKARPHOL  2,102,100
PORTABLE WEED BURNING ERADICATOR
Filed March 27, 1937   2 Sheets-Sheet 2
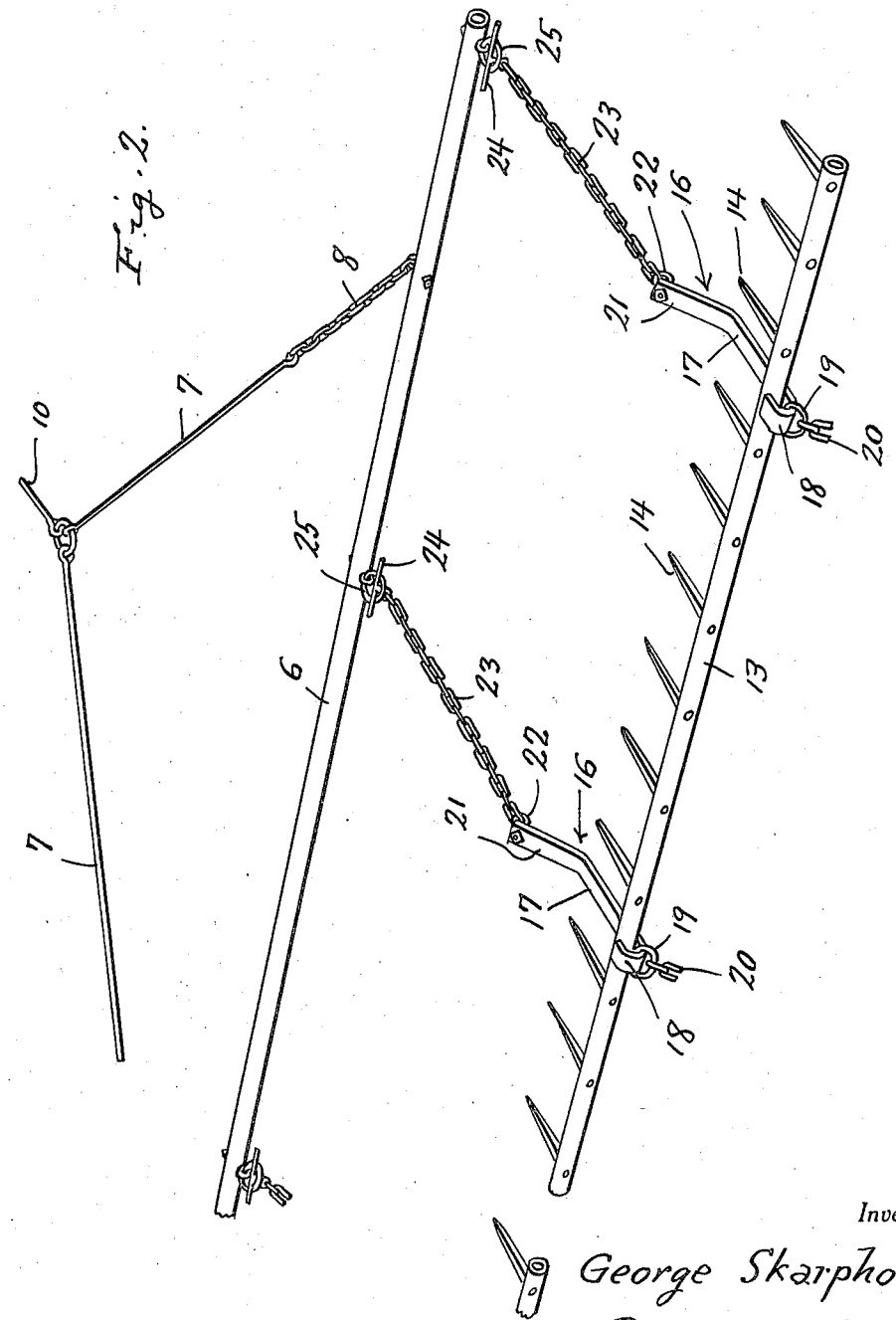
Inventor
George Skarphol
By Clarence A. O'Brien
Hyman Berman
Attorneys Patented Dec. 14, 1937

2,102,100

UNITED STATES PATENT OFFICE 2,102,100

PORTABLE WEED BURNING ERADICATOR

George Skarphol, Souris, N. Dak.

Application March 27, 1937, Serial No. 133,453

3 Claims. (Cl. 56—375)

This invention relates to what is believed to be a structurally new and novel weed eradicating structure in the nature of a fuelless burner, the same being adapted to effectively clear a field of any wild growth, such as Russian thistle and the like, which is detrimental to the satisfactory raising of good crops.

I am aware of the fact that weed burning eradicators of this portable type are not broadly new. It appears, however, that most of these structures work on the principle of utilizing a suitable fuel tank and means for delivering fuel to the weed carriers, and since such methods are needlessly expensive, I have perfected a miscellaneous weed burning eradicator, which, instead of requiring fuel, is a self-feeding drag-type burner.

More specifically, in reducing to actual practice the inventive principles of this seemingly new conception, I have found it expedient and practicable to adopt what may be called a twin-section, slidable drag which picks up the weeds as it is moved along and burns the weeds during transit.

Other features and advantages will become more readily apparent from the following description and drawings.

In the drawings:

Figure 1 is a diagrammatic top plan view of a complete weed burning eradicator constructed in accordance with the principles of this invention.

Figure 2 is a fragmentary perspective view showing to advantage certain of the essential features.

Figure 3 is an end view of one of the toothed rakes illustrating to advantage the skid causing the rake to skim over the ground.

Figure 4 is a fragmentary top plan view of the skid, bar and tooth arrangement.

Figure 5 is a perspective view of one of the weed lifting and grate-forming teeth.

Looking at the diagrammatic arrangement depicted in Figure 1, it is evident that the structure may be hauled over the ground by horse power or any other suitable power available. In a unitary sense, it resembles a twin-section rake, but is in effect a portable grate with the sections chained together and movable on skids, whereby as the device is drawn over the surface, the weeds are picked up, mixed with the weeds which are already on fire, thus continuously feeding the fire and at the same time eradicating the weeds in the path of movement of the device.

Also, as seen in Figure 1, the numeral 6 designates an evener bar to which the rearwardly diverging cables 7 are connected through the instrumentality of properly positioned chains 8. Attached to the converging ends of this substantially V-shaped cable connection is a central draft cable 10 which is in turn joined to the doubletree assembly 11 with which the horses are hitched.

The two units forming the complemental sections of the so-called twin rake assembly are differentiated by the letters A and B. They are duplicate construction. Each section or unit is actually composed of three spaced parallel toothed rakes flexibly joined together and properly supported. Inasmuch as each rake is substantially the same, it is believed that a description of one rake, denoted by the numeral 12, will suffice. As disclosed, for example, in Figure 2, this comprises a tube or bar 13 having pointed teeth 14 connected to the working edge thereof. The teeth 14 are preferably of the elongated spear form shown in Figure 5. The reduced shank 15 passes through an aperture in the tube where it is suitably bound or fastened in place.

The numerals 16 designate the shoes or skids. Each skid comprises a metal strap portion 17 of which forms a runner, and this underlies the toothed bar 13 and has one end formed into a hook and embracing the tube and welded or otherwise secured in place at 18. The arrangement is such that the hook is spaced from the bar to accommodate an adjacent link 19 of one of the connecting chains 20. The forward ends of the skids are directed upwardly to the desired elevation to insure effective skimming over the ground. The upwardly deflected ends 21 are provided with eye bolts 22 to accommodate the assembling and connecting chains 20 or 23. The chains 23 terminate in connecting pins 24 secured to the complemental eyes 25 on the evener bar 6. This provides a suitable detachable connection which makes for compactness and convenience of disassembling and storage, etc. Thus, each rake unit is made up of a series of individual toothed rakes mounted on appropriate skids, the assembly of sections A and B being such that the whole device is in effect a weed lifting grate of a fuelless self-feeding type. Consequently, as the device is dragged through the field, the weeds are picked up and when a pile collects on the device the pile is set on fire and then as other weeds are picked up by the device and fed into the fire, they are consumed as the device goes along.

The structure is characterized by requisite durability and flexibility, the rakes in proper alignment and individually flexible, and each part contributes its proportionate share, whereby the cumulative force and effect is such as to render the structure aptly fitted for the purposes intended.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, an evener bar, draft means connected thereto, multiple rake sections connected to and following the evener bar, each section including spaced parallel bars, forwardly extending teeth connected with each bar and runners connected with each bar and having portions extending under the bar to raise the teeth off the ground, said runners extending beyond the teeth together with chain means connecting the respective runners together to allow the desired independent compensating or self-leveling action.

2. In a structure of the class described and as a component part thereof, a pair of skids, and a toothed rake supported on said skids, the forward ends of the skids being deflected upwardly and provided with chains for connection with draft means.

3. As a component part of a construction of the class described, a rake including bar, a plurality of teeth connected thereto, skids connected to said bar, each skid including a hook attached at one end to the bar, the opposite end of the skid being deflected upwardly and provided with means to permit connection of a pull chain thereto.

GEORGE SKARPHOL.